US007851102B2

(12) United States Patent
Andreas-Schott et al.

(10) Patent No.: US 7,851,102 B2
(45) Date of Patent: Dec. 14, 2010

(54) FUEL CELL STACK COMPRESSION RETENTION SYSTEM USING OVERLAPPING SHEETS

(75) Inventors: Benno Andreas-Schott, Pittsford, NY (US); Jeffrey A. Rock, Fairport, NY (US); Gerald W. Fly, Geneseo, NY (US); Thomas P. Migliore, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 751 days.

(21) Appl. No.: 11/762,904

(22) Filed: Jun. 14, 2007

(65) Prior Publication Data
US 2008/0311457 A1 Dec. 18, 2008

(51) Int. Cl.
*H01M 2/20* (2006.01)
(52) U.S. Cl. .................. 429/470; 429/452; 429/467
(58) Field of Classification Search ........................ None
See application file for complete search history.

(56) References Cited

U.S. PATENT DOCUMENTS 5,484,666 A 1/1996 Gibb et al.
2005/0277012 A1* 12/2005 Inagaki ..................... 429/37

FOREIGN PATENT DOCUMENTS

JP   08-045535   *   2/1996

OTHER PUBLICATIONS machine translation of JP 08-045535.*

* cited by examiner

*Primary Examiner*—Patrick Ryan
*Assistant Examiner*—Cynthia Lee
(74) *Attorney, Agent, or Firm*—Fraser Clemens Martin & Miller LLC; J. Douglas Miller

(57) ABSTRACT

A fuel cell system is provided including a fuel cell stack having a plurality of fuel cells disposed between a first end unit and a second end unit. The fuel cell system includes a compression retention system comprising a first sheet coupled to the first end unit and a second sheet coupled to the second end unit. A plurality of springs is disposed between the first sheet and the second sheet and is adapted to apply a compressive force to the fuel cell stack. The claimed invention includes methods for assembling the fuel cell system.

19 Claims, 7 Drawing Sheets

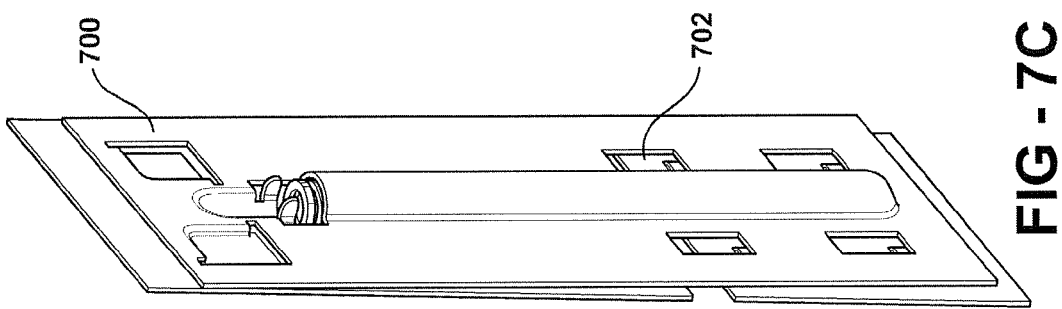
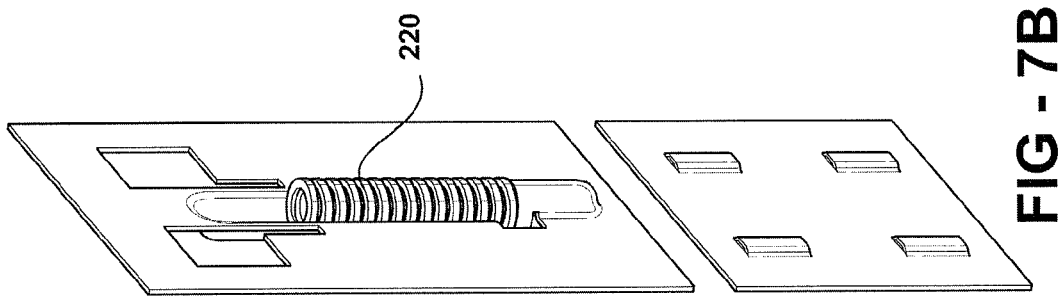
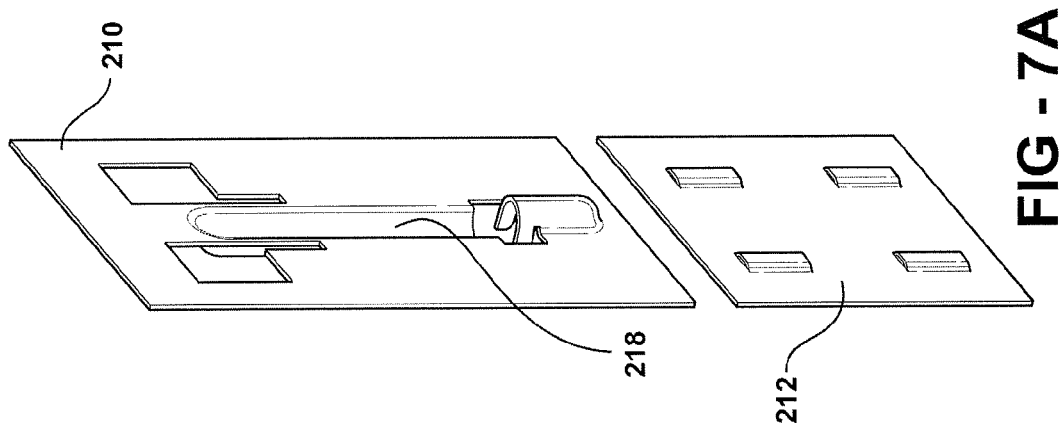

FUEL CELL STACK COMPRESSION RETENTION SYSTEM USING OVERLAPPING SHEETS

FIELD OF THE INVENTION

The present disclosure relates generally to electrochemical fuel cell systems, and more particularly to compression retention systems for electrochemical fuel cell systems.

BACKGROUND OF THE INVENTION

A fuel cell has been proposed as a clean, efficient, and environmentally responsible power source for electric vehicles and various other applications. One example of the fuel cell is a Proton Exchange Membrane (PEM) fuel cell. The PEM fuel cell includes a membrane-electrode-assembly (MEA) that generally includes a thin, solid polymer membrane-electrolyte having an electrode with a catalyst on both faces of the membrane-electrolyte.

The PEM fuel cell generally has porous conductive materials, also known as gas diffusion media, which abut the anode and cathode electrode layers and distribute fuel and oxidant gases. Fuel, such as hydrogen gas, is introduced at the anode where it reacts electrochemically in the presence of the catalyst to produce electrons and protons. The electrons are conducted from the anode to the cathode through an electrical circuit connected therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product.

The MEA is generally interposed between a pair of electrically conductive contact elements or bipolar plates to complete a single PEM fuel cell. Bipolar plates serve as current collectors for the anode and cathode, and have appropriate channels and openings formed therein for distributing the gaseous reactants (i.e., $H_2$ and $O_2$/air) over the surfaces of the respective electrodes.

In practice, however, PEM fuel cells are not individually operated. Rather, PEM fuel cells are connected in series, or stacked one on top of the other, to form what is usually referred to as a fuel cell stack. PEM fuel cell stacks are generally loaded in compression in order to maintain low interfacial electrical contact resistance between the bipolar plates, the gas diffusion media, and the catalyst electrode. The low interfacial contact resistance in a PEM fuel cell stack is directly related to the compression loading. Typically, compression loads on the bipolar plate range from about 50 to about 400 psi, and are controlled by a compression retention system. Importantly, such systems are often installed under an even higher building load to compensate for loss in compression that occurs when the building load is removed.

Compression retention systems are typically designed in a manner effective to offset strains produced by membrane swelling and compressive stress relaxation in the fuel cell stack. Such systems act to minimize an over-compression and damage of gas diffusion media in the fuel cell stack, as well as maintain the stack compression and contact pressure between bipolar plates, gas diffusion media, and catalyst layers. It is disclosed in U.S. Pat. No. 5,484,666 that conventional compression systems have consisted of tie rods extending through and between end plate assemblies secured with fastening nuts. Springs threaded on the tie rods and interposed between the fastening nuts and the end plates have been used to apply resilient compressive force to fuel cell stacks in the stacking direction.

In addition to compression retention systems, conventional PEM fuel cell assemblies include delivery subsystems and componentry for distribution of hydrogen fuel, oxidant and coolant to the fuel cell stack. For example, devices such as manifolds with ports for directing gases and fluids to the interior of the stack are common. Subsystems for exhausting reaction products and coolant are also generally present. Further found within fuel cell systems are current collectors, cell-to-cell seals, insulation, pumps, fans, valves, compressors, associated plumbing, electrical connections, and instrumentation. Such subsystems and devices are volume consuming, can represent increased thermal mass when located outside the stack (requiring more time to warm the stack to appropriate temperatures), and in some cases can cause an electrically parasitic load on the fuel cell stack.

Peripheral preconditioning devices and componentry have also been necessary for optimum operation and performance of a fuel cell stack. Such systems can include, for example, reformers for extracting usable hydrogen fuel from hydrogen-containing feedstock. Additionally, humidifiers for wetting the PEM layers of the fuel cell stack and facilitating conduction of protons from the anode layers to the cathode layers of the MEA are often necessary. These peripheral devices require extensive additional hardware which can also lead to poor system efficiency. This poses problems in many applications, such as vehicular applications, where it is desirable that weight and size of a fuel cell system be minimized.

There is a continuing need for a fuel cell system that has an optimized mass and volume and that can be manufactured with an optimized amount of componentry.

SUMMARY OF THE INVENTION

In concordance with the instant disclosure, a fuel cell system that has an optimized mass and volume and that may be manufactured with an optimized amount of components is surprisingly found.

In one embodiment, a fuel cell system is provided including a fuel cell stack having a plurality of fuel cells disposed between a first end unit and a second end unit. The fuel cell system includes a compression retention system comprising a first sheet coupled to the first end unit and a second sheet coupled to the second end unit. A plurality of springs is disposed between the first sheet and the second sheet and is adapted to apply a compressive force to the fuel cell stack.

In a further embodiment, a method for assembling the fuel cell system is described. The method includes first providing the fuel cell stack having the first end unit and the second end unit, and providing the compression retention system. The compression retention system has a first sheet with a plurality of first windows coupled to the first end unit, and a second sheet with a plurality of second windows coupled to the second end unit. The first windows and the second windows are aligned to form a plurality of apertures. A spring is then inserted into each of the plurality of apertures, wherein the springs and the first and second sheets cooperate to apply a compressive force to the fuel cell stack.

In another embodiment, the method of the invention first includes inserting the springs in an uncompressed state and then applying a compression load to the plurality of springs, wherein the compressive force is applied to the fuel cell stack.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 7A to 7D are fragmentary perspective views showing an illustrative sequence of assembly of the compression retention system depicted in FIGS. 2 and 3, including a spring retainer for insertion of the spring.

DETAILED DESCRIPTION OF THE INVENTION

Figure 1:
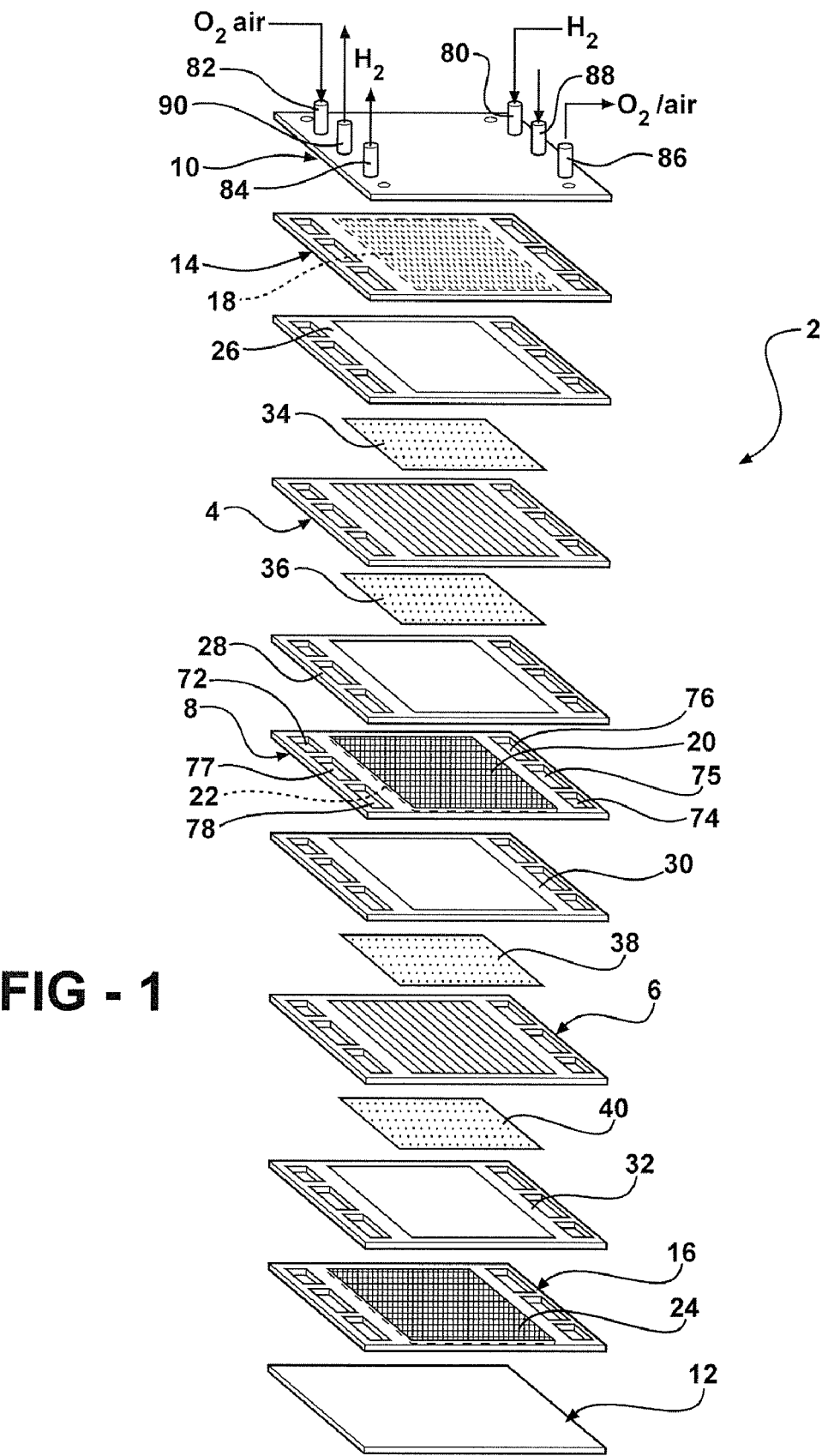
FIG. 1 illustrates a schematic, exploded perspective view of a PEM fuel cell stack (only two cells shown)

The following description is merely exemplary in nature and is not intended to limit the present disclosure, application, or uses. It should be understood that throughout the drawings, corresponding reference numerals also indicate like or corresponding parts and features. In respect of the methods disclosed, the steps presented are exemplary in nature, and thus, are not necessary or critical.

FIG. 1 depicts a PEM fuel cell stack 2 having a pair of membrane-electrode-assemblies (MEAs) 4, 6 separated from each other by an electrically conductive bipolar plate 8. The illustrative PEM fuel cell stack 2 depicted in FIG. 1 has two cells, although it should be appreciated that a fuel cell stack 2 in practice may include many more fuel cells. The MEAs 4, 6 and bipolar plate 8, are stacked together between end plates 10, 12, and end contact elements 14, 16. The end contact element 14, both working faces of the bipolar plate 8, and the end contact element 16 contain a plurality of flowpath grooves or channels 18, 20, 22, 24, respectively, for distributing fuel and oxidant gases such as $H_2$ and $O_2$, for example, to the MEAs 4, 6. Nonconductive gaskets 26, 28, 30, 32 provide seals and electrical insulation between components of the fuel cell stack 2.

Diffusion media 34, 36, 38, 40 are typically formed by a gas permeable conductive material such as a carbon/graphite diffusion paper, for example. The diffusion media 34, 36, 38, 40 are caused to press against the electrode faces of the MEAs 4, 6. The end contact elements 14, 16 are caused to press against the diffusion media 34, 40 respectively, while the bipolar plate 8 is caused to press against the diffusion medium 36 on an anode face of MEA 4, configured to accept an hydrogen-bearing reactant, and against diffusion medium 38 on a cathode face of MEA 6, configured to accept an oxygen-bearing reactant. The oxygen-bearing reactant is supplied to a cathode side of the fuel cell stack 2 from a storage tank 46 by an appropriate supply conduit 42. The hydrogen-bearing reactant is supplied to an anode side of the fuel cell stack 2 from storage tank 48, by an appropriate supply conduit 44. Alternatively, ambient air may be supplied to the cathode side as an oxygen-bearing reactant and hydrogen to the anode side from a methanol or gasoline reformer, or the like. Exhaust conduits (not shown) for both the anode and the cathode sides of the MEAs 4, 6 are also provided. Additional conduits 50, 52, 54 are provided for supplying a coolant to the bipolar plate 8 and the end plates 14, 16. Appropriate conduits (not shown) for exhausting coolant from the bipolar plate 8 and the end plates 14, 16 are also provided.

It should be appreciated that even though particular embodiments disclosed herein describe fuel cell systems having PEM fuel cells, the invention of the disclosure may be applied to fuel cell systems utilizing other types of fuel cells. The other types of fuel cells may include metal hydride fuel cells, phosphoric acid fuel cells, solid oxide fuel cells, electrogalvanic fuel cells, and alkaline fuel cells, for example.

Figure 2:
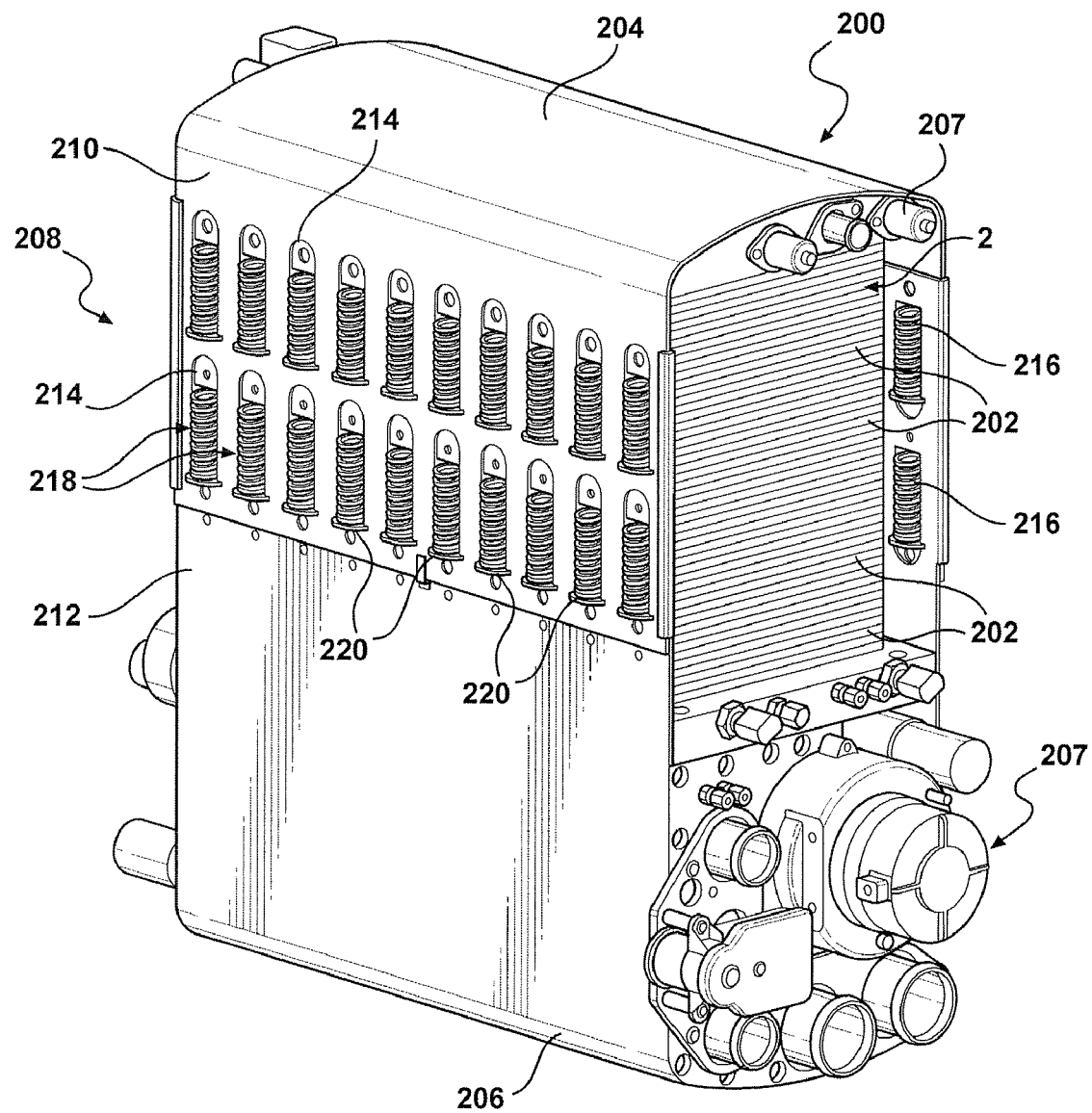
FIG. 2 is a perspective view showing the assembled PEM fuel cell stack of FIG. 1 with a compression retention system according to an embodiment of the invention.
Figure 3:
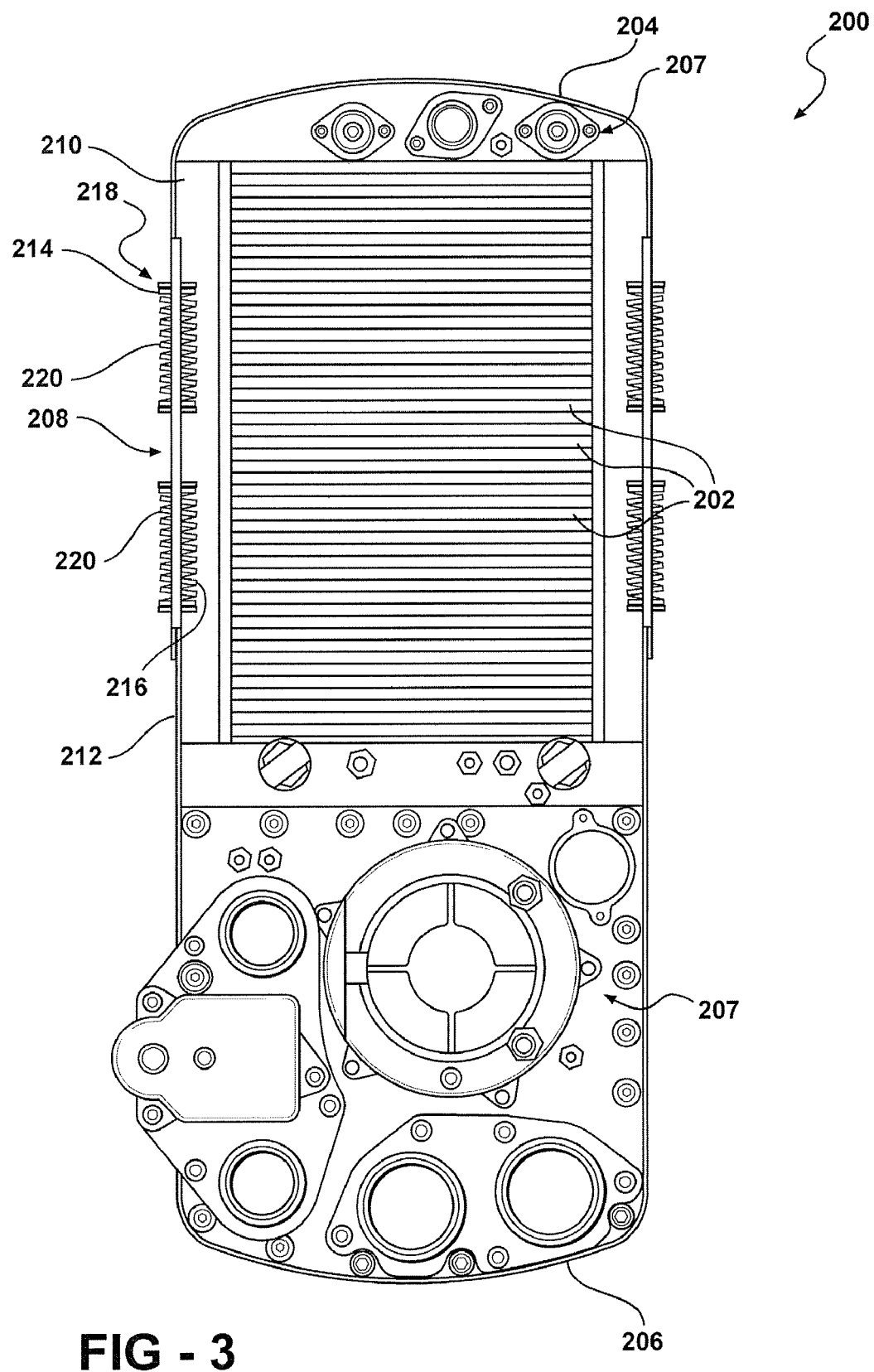
FIG. 3 is a side elevational view of the assembled PEM fuel cell stack with the compression retention system depicted in FIG. 2.

Referring next to FIGS. 2 and 3, one embodiment of a fuel cell system 200 according to the present disclosure is shown. The fuel cell system 200 has the fuel cell stack 2 including a plurality of individual fuel cells 202 disposed between a first end unit 204 and a second end unit 206. A compressive force is applied to the fuel cell stack 202 by a compression retention system 208.

In particular embodiments, at least one of the first and second end units 204, 206 is an end plate. In a particularly illustrative embodiment, the first and second end units 204, 206 house at least one, and in particular embodiments more than one, fuel cell subsystems and related devices 207 involved in preconditioning and operation of the fuel cell stack 2. As nonlimiting examples, the fuel cell subsystems and related devices 207 housed within the first and second end units 204, 206 can include fluid passages, e.g. hydrogen fuel and oxidant ($O_2$/air) passages, coolant pumps, recirculation pumps, drainage valves, insulation, fans, compressors, valves, electrical connections, reformers, humidifiers, water vapor transfer units, heat exchangers, and related instrumentation. It should be recognized that additional fuel cell subsystems and related devices 207 used in support of the fuel cell system 200 can also be housed in the first and second end units 204, 206. The integration of the fuel cell subsystems and related devices 207 into end units 204, 206 contributes to faster cold starts as the systems are heated more quickly due to the proximity to the fuel cell stack 2. Furthermore, integration results in faster re-starts as there is little to no plumbing external to the fuel cell system, i.e an opportunity for heat energy loss is minimized. The integration of the fuel cell subsystems and related devices 207 into the end units 204, 206 also eliminates the need for an external housing and conduits, thereby minimizing the overall thermal mass of the system.

The first and second end units 204, 206 of the present disclosure may have any shape as desired. In the embodiment shown, the end units 204, 206 have a curvature sufficient to transform the compressive force from the compression retention system 208 into a substantially uniform compressive stress across the fuel cell stack 2. As a nonlimiting example, the curvature of one of the end units 204, 206 may be defined by a single radius, for instance, a semicircular cross-sectional shape. The overall curvature of the end units 204, 206 can also be defined by multiple radii. It should be appreciated that the radii are dependant upon the width and thickness of the end units 204, 206, as well as the overall height available for the fuel cell system 200, and can be selected as desired. The curvature may also have further intermediate or transitional radii, and may include surfaces not characterizable by radii, e.g. gradually or continuously sloping surfaces. It should be recognized by one of skill in the art that the aforementioned structure, material composition, and curvature of the first end unit 204 may be applied equally to the second end unit 206 of the invention.

The first and second end units 204, 206 may be suitably formed from metal, metal alloys, or plastic or plastic composite materials. Illustratively, the plastic or plastic composite material is a high performance plastic. The high performance plastic can be selected from, as nonlimiting examples, polyether ether ketones (PEEK), polyether sulfones (PES), polyphenyl sulfones (PPSU), polysulfones (PSU), polysuper sulfones (PSS), polyphthalamides (PPA), polyaryl amides (PAA), poly amide imides (PAI), poly ether imides (PEI), ultra-high molecular weight polyethylenes (UHMWPE), phenolic plastics and combinations thereof. The plastic or plastic composite material may further include one or more reinforcing fillers. Suitable reinforcing fillers include, as non-limiting examples, coated or uncoated polyester fibers, aramid fibers, aramid pulp, carbon fibers, carbon black powder, graphite powder, metal powder, metal fibers, glass fibers, glass powder, hollow glass spheres, and combinations thereof. Conventional additives for plastics compounds may also be included in the described plastic or plastic composite materials. Nonlimiting examples of conventional additives include non-reinforcing fillers (e.g., calcium carbonate, silica), plasticizers, antidegradents (e.g. antioxidants, antiozonants, UV absorbers), pigments and colorants, and processing aids. One of skill in the art should recognize that suitable plastic or plastic composite materials are chosen based on rigidity, temperature resistance, chemical resistance, and dimensional stability. For example, suitable plastic or plastic composite materials do not swell significantly when exposed to water, nor degrade significantly with exposure to temperatures associated with typical operation of fuel cell stacks. It should also be appreciated that suitable plastic materials do not contain materials that leach or migrate significantly from the material and into the fuel cell stack 2. It should further be appreciated that the end units 204, 206 may insulate the fuel cell stack 2 and integrated subsystems.

With reference to FIGS. 2 to 4B, the compression retention system 208 according to the present disclosure includes a first sheet 210 overlapping and disposed adjacent to a second sheet 212. The first sheet 210 includes a plurality of first windows 214 formed therein. The second sheet 212 also includes a plurality of second windows 216 formed therein. The plurality of first windows 214 and the plurality of second windows 216 cooperate to form a plurality of apertures 218 in the compression retention system 208 adapted to receive a plurality of springs 220 therein. In one embodiment, shown in FIG. 4A, each of the first windows 214 and the second windows 216 are vertically offset from one another to form the plurality of apertures 218 having dimensions different than the dimensions of the individual first and second windows 214, 216.

Figure 4A:
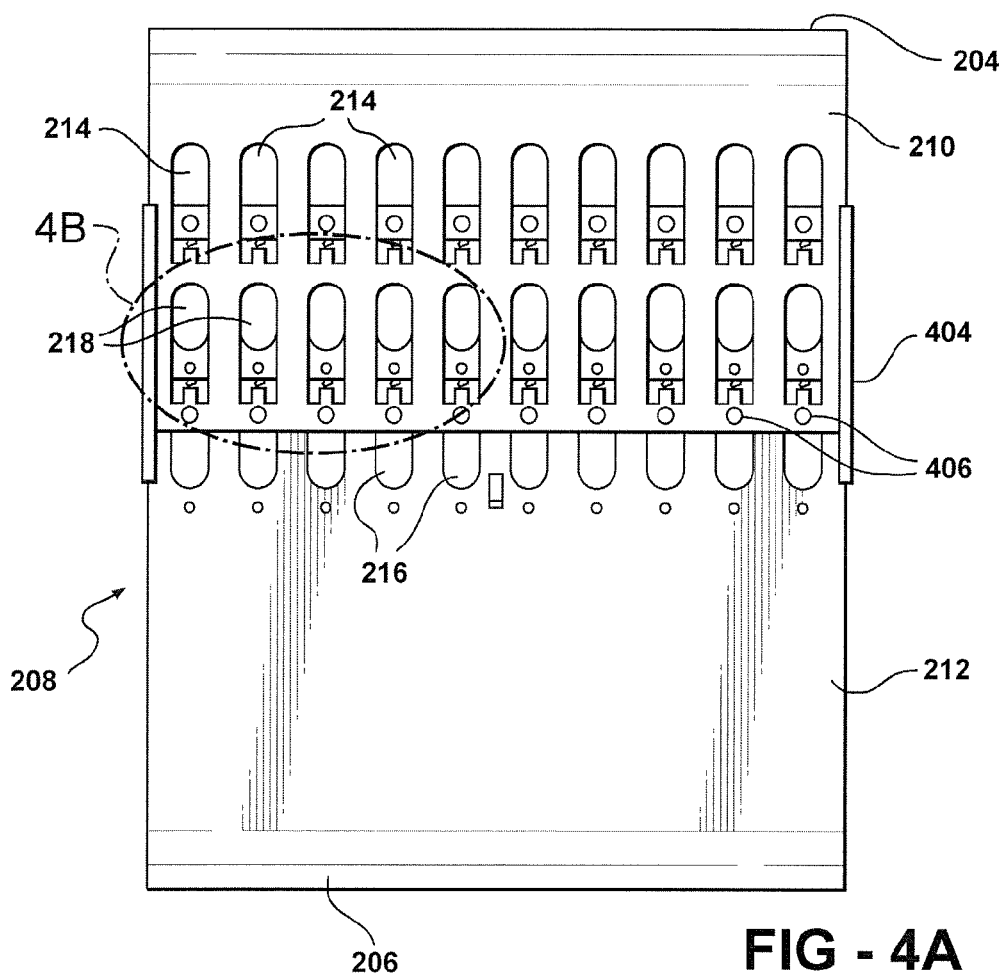
FIG. 4A is an elevational side view of a portion of the compression retention system illustrated in FIGS. 2 and 3 shown unassembled and without springs.
Figure 4B:
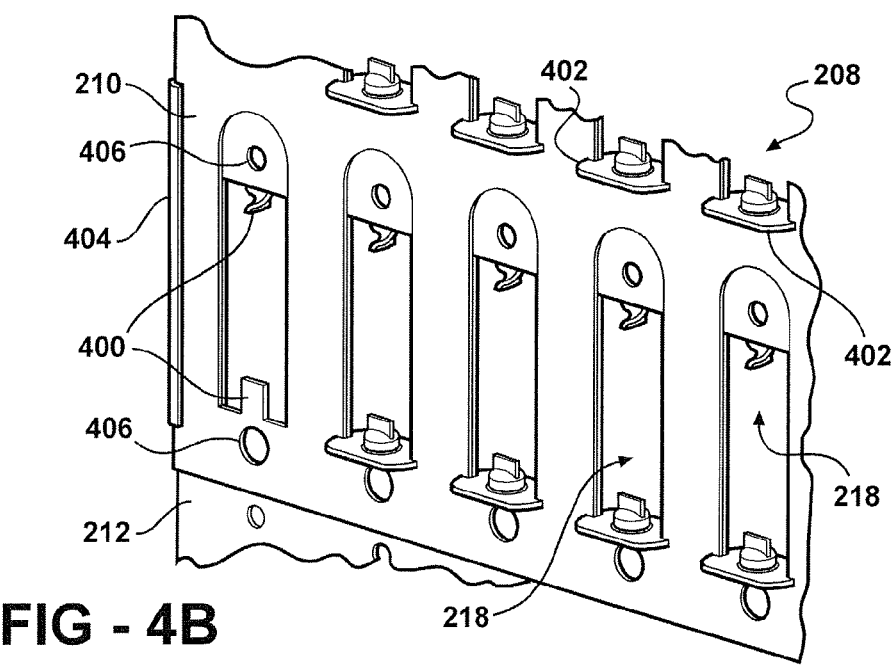
FIG. 4B is an enlarged, fragmentary perspective view of the compression retention system illustrated in FIG. 4A.
Figure 5A:
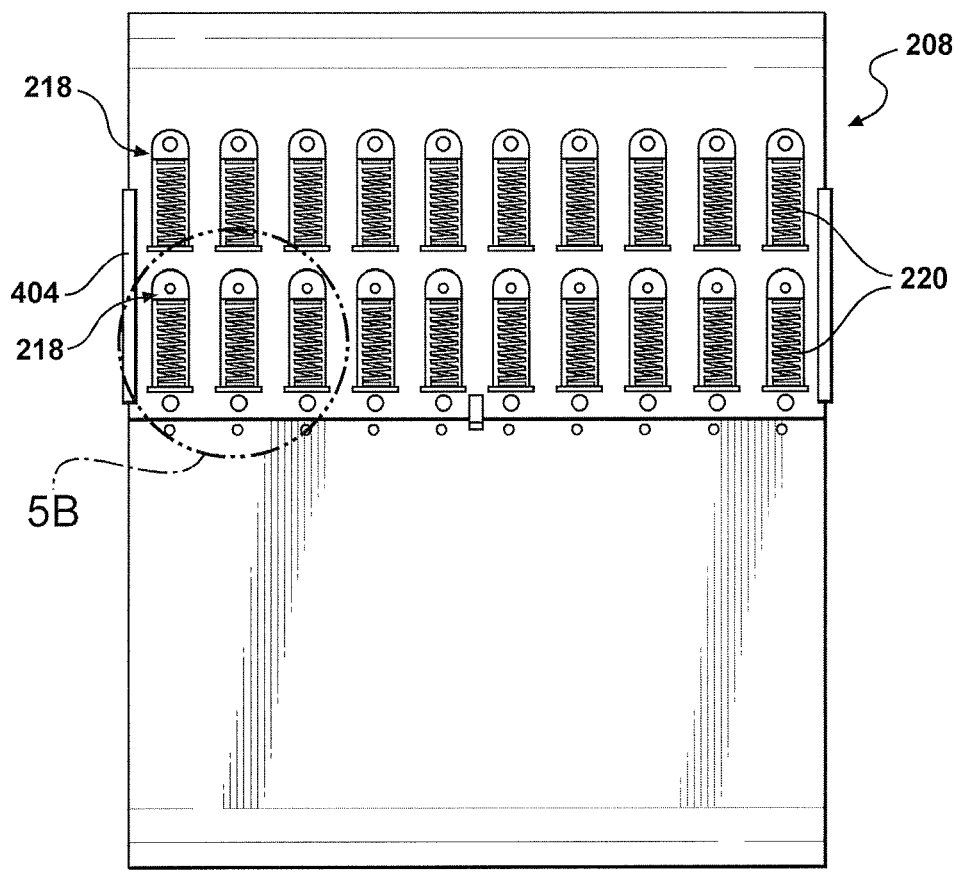
FIG. 5A is a side elevational view of the compression retention system illustrated in FIGS. 2 and 3, shown assembled and including the springs.
Figure 5B:
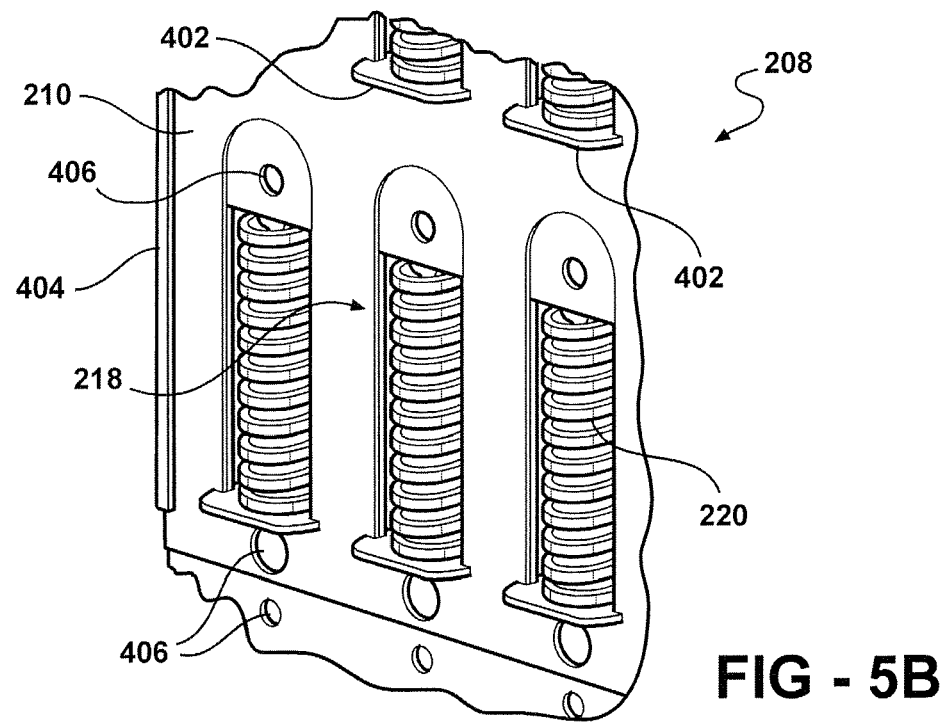
FIG. 5B is an enlarged, fragmentary perspective view of the compression retention system illustrated in FIG. 5A.

It should be understood that the plurality of springs 220 is employed to provide the compressive force to the fuel cell stack 2. In particular embodiments, the plurality of springs 220 is compressed. The plurality of springs 220 can include, as illustrative examples, one or more disc springs and/or coiled springs. Additional suitable springs can include planar springs, leaf springs, corrugated springs, and gas springs, for example. The springs 220 may be stacked adjacent to one another or disposed otherwise as desired. One of ordinary skill in the art should understand that the springs 220, when compressed and inserted into the apertures 218, apply a tensile load to the both the first and second sheets 210, 212. As shown in FIG. 4A, the first sheet 210 is urged downwardly and the second sheet 212 is urged upwardly. The tensile load applied to the first sheet 210 and the second sheet 212 provides the compressive force to the fuel cell stack 2.

The first and second sheets 210, 212 of the disclosure are formed from a material sufficient to provide the compressive force to the fuel cell stack 2. Suitable materials may include, for example, metal, metal alloys, plastic, or plastic composite materials. In one embodiment, the first and second sheets 210, 212 include a thin layer of metal. In a nonlimiting example, the thin layer of metal is a sheet metal. Illustrative examples of suitable sheet metals include aluminum, brass, copper, steel, tin, nickel, titanium, and alloys thereof.

It should be recognized that sheet metal is available in a variety of gauges which are suitable for the first and second metal sheets 210, 212 of the present disclosure. As nonlimiting examples, suitable sheet metal gauges can range from about 0.016 inches (about 0.4 mm) to about 0.16 inches (about 4 mm). In particular embodiments, the thickness of the first and second sheets 210, 212 is about 0.05 inches (about 1.2 mm). It is understood, however, that sheet metal of other thickness can be used as desired. The sheet metal is typically sized according to the desired tensile loads to be applied to the sheets 210, 212.

The first and second sheets 210, 212 are respectively coupled to the first end unit 204 and the second end unit 206. The first and second sheets 210, 212 may be secured to the first and second end units 204, 206, respectively, by any conventional fastening device (not shown). As nonlimiting examples, the fastening device is at least one of a bolt, a weld, a rivet, a snap, and a clamp. In particular embodiments, the sheets 210, 212 can be disposed over the first and second end units 204, 206 after formation of the end units 204, 206, for example, via molding. In certain embodiments, the first sheet 210 is disposed over the first end unit 204. In further embodiments, the second sheet 212 is disposed over the second end unit 206. As a nonlimiting example, the first and second sheets 210, 212 may circumscribe the fuel cell stack 2. Thus, a skilled artisan should appreciated that a tensile load applied to the first and second sheets 210, 212 causes a compressive stress on the first and second end units 204, 206. The compressive stress on the first and second end units 204, 206 results in a compressive force on the fuel cell stack 2.

It should be understood that, the springs 220 do not provide a substantial bending moment to the sheets 210, 212. As a nonlimiting example, the plurality of springs 220 is substantially centered within the apertures 218 of the compression retention system 208. Accordingly, the first sheet 210 and the second sheet 212 have substantially no bending moment. One of skill in the art should appreciate that the springs 220, if disposed substantially off-center within the apertures 218, may result in an undesirable bending moment. The undesirable bending moments may result in stresses that limit the useful life of the compression retention system 208.

Referring now to FIGS. 4a to 5b, the compression retention system 208 of the disclosure may include a plurality of alignment features 400 adapted to substantially center the plurality of springs 220 when inserted into the apertures 218. As a nonlimiting example, the alignment features 400 are formed on at least one of the first sheet 210 and the second sheet 212, for example by cutting or stamping the alignment features 400 into the sheets 210, 212. One of ordinary skill in the art should appreciate that forming the features 400 from the sheets 210, 212 minimizes a quantity of additional components required to hold the springs 220 in place. As shown in FIG. 4B, the alignment features 400 include tabs that are flat or twisted, for example. It should be understood that alternative alignment features 400 adapted to substantially center the springs 220 may be used as desired.

The compression retention system 208 may further include a plurality of assembly spacers 402. In particular embodiments, the assembly spacers 402 are disposed on the alignment features 400. The assembly spacers 402 are adapted to be stacked atop one another, for example, and allow the compression retention system 208 to be employed with springs 220 of different dimensions. Thus, the compression retention system 208 may be used with fuel cell stacks 2 having different quantities of fuel cells 202.

In further examples, the assembly spacers 402 militate against a separation of the first and second sheets 210, 212 disposed adjacent one another in the compression retention system 208. The compression retention system 208 may further include one or more brackets 404 that slide over adjacent edges of the first and second sheets 210, 212 and militate against the separation of the first and second sheets 210, 212 during assembly and operation of the fuel cell system 200. It should be appreciated that the an edge of the first or second sheet 210, 212 may be formed so as to curve over the edge of the adjacent first or second sheet 210, 212, thereby functioning as the one or more brackets 404.

The first and second sheets 210, 212 of the compression retention system 208 may include at least one slot feature 406. The slot feature 406 is adapted to be used with an assembly tool (not shown) and facilitates a relative movement of the first sheet 210 and the second sheet 212. The assembly tool may facilitate an insertion of the plurality of springs 220. It should be appreciated that the slot features 406 may include apertures or indentations formed in the sheets 210, 212, for example. In one embodiment, the slot features 406 are substantially circular apertures formed through the sheets 210, 212. Other geometries for the slot features 406 may be used as desired.

The present disclosure further includes a method for assembling the fuel cell system 200. The method first includes the step of providing the fuel cell stack 2 with the plurality of fuel cells 202 disposed between the first end unit 204 and the second end unit 206. The compression retention system 208 is provided with the first sheet 210 having the plurality of first windows 214 formed therein, the first sheet 210 coupled to the first end unit. The second sheet 212 is provided with the plurality of second windows 216 formed therein and the second sheet 212 is coupled to the second end unit 206. The plurality of first windows 214 and the plurality of second windows 216 are then aligned to form the plurality of apertures 218.

Following the alignment of the first and second windows 214, 216, one of the plurality of springs 220 is inserted into one of the apertures 220. In particular embodiments, the plurality of springs 220 is precompressed prior to insertion. The springs 220 may be precompressed as desired, depending on the fuel cell stack 2 dimensions, and to achieve a desired ending compressive force on the fuel cell stack 2. As an illustrative example, the springs 220 may be placed in a compression tool that compress the springs 220 to the desired level of compression and facilitates insertion of the springs 220 into the apertures 218. It should be appreciated that other means for precompressing the springs 220 and inserting the springs 220 into the compression retention system 208 may be used as desired.

In a further embodiment, the plurality of springs 220 is precompressed to be inserted into the apertures 218 in communication with the alignment features 400. For example, a first force is applied to the first sheet 210, wherein the first sheet 210 is urged toward the second end unit 206. A second force is applied to the second sheet 212, wherein the second sheet 212 is urged toward the first end unit 204. In particular embodiments, the first force is applied by engaging the slot features 406 on the first sheet 210 with an appropriate tool and causing the first sheet 210 to move toward the second end unit 206. Similarly, the second force is applied by engaging the slot features 406 on the second sheet 210 with an appropriate tool and causing the second sheet 212 to move toward the first end unit 204. The precompressed springs 220 are then inserted into the apertures and allowed to expand over the alignment features 400. The compressive force is thereby applied to the fuel cell stack 2 via the first and second sheets 210, 212.

Figure 6:
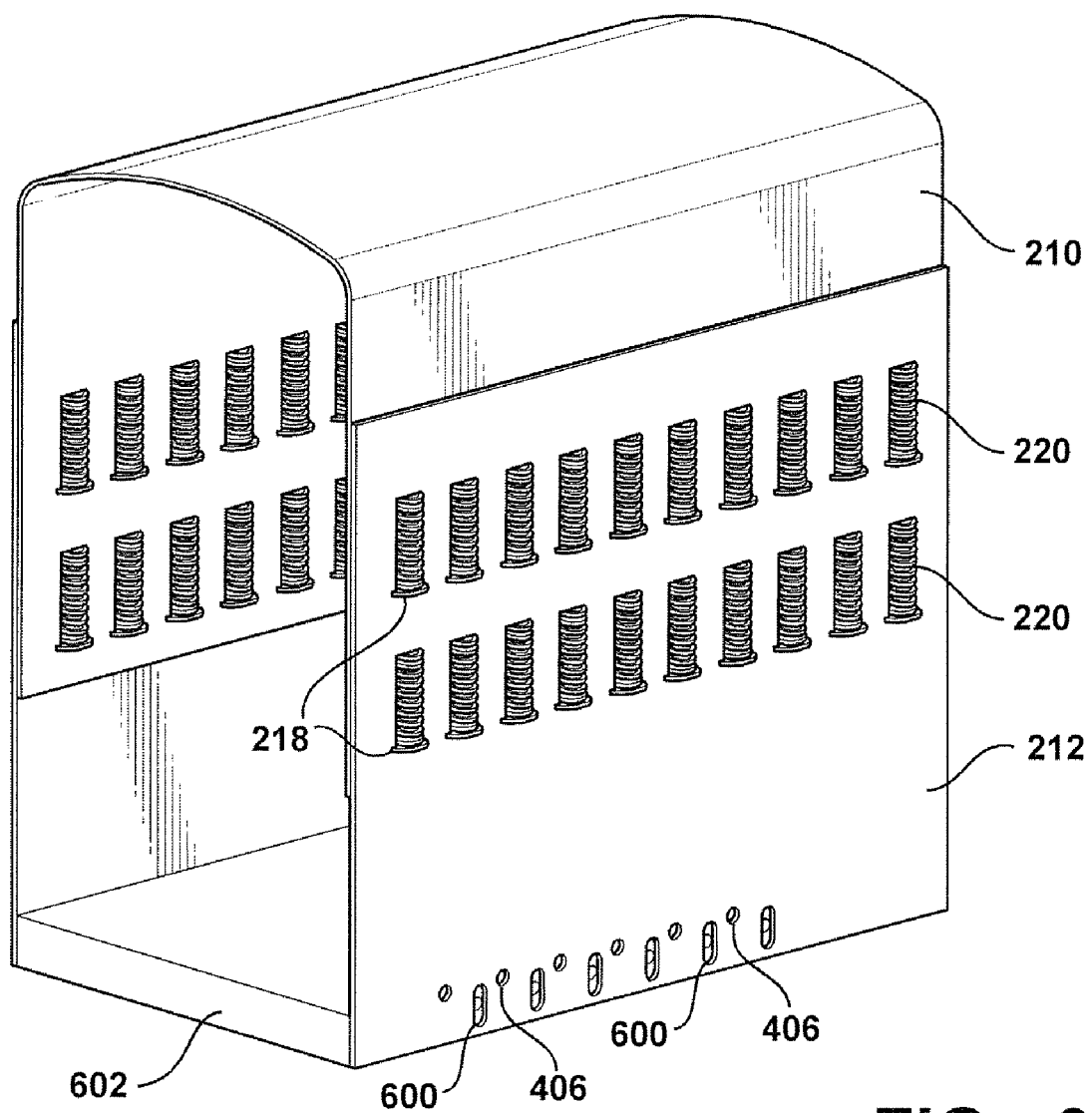
FIG. 6 is a perspective view of the compression retention system illustrated in FIGS. 2 and 3 including an endplate.

In an alternative embodiment, the plurality of springs 220 is inserted in an uncompressed state. Following the insertion, for example with an appropriate insertion tool, the plurality of springs 220 is compressed through the application of a compression load. In one example shown in FIG. 6, the compression load is applied to the plurality of springs 220 by applying a force to the second sheet 212, wherein the second sheet 212 is urged toward the second end unit 206. As with previous embodiments, the force may be applied with an appropriate tool that engages the slot features 406 formed in the second sheet 212. Following the application of the force to the second sheet 212, the second sheet 212 is secured to the second end unit 206. The second sheet 212 may be secured by one or more of the fastening devices as described herein. For example, the second sheet 212 may be secured by bolts (not shown) inserted through bolt apertures 600 formed in the second sheet 212 and an endplate 602. It should be appreciated that the endplate 602 may be the second end unit 206, for example. The compressive force is thereby applied to the fuel cell stack 202.

With reference to FIGS. 7A to 7D, the method of the invention may further include the steps of providing a spring retainer device 700 adapted to engage the first sheet 210 and substantially envelope the spring 220. As the spring retainer device 700 substantially envelopes the springs 220, it should be understood that longer springs 220 may be employed without buckling. The spring retainer device 700 may include one or more tabs (not shown) configured to cooperate with the one or more slots 406 formed in the first sheet 210. The method further includes engaging the first sheet 210 with the spring retainer device 700, and sliding the spring retainer device 700 toward the second end unit 206. The springs 220 are thereby compressed. Following the compression of the springs 220, the spring retainer device 700 may be secured to the second sheet 212, e.g., with a fastening device as described herein. In another embodiment, the spring retainer device 700 may include a fastening feature 702, for example a slot or hook, configured to couple with the second sheet 212. The compression retention system 208 is thereby assembled.

It should be appreciated that the overall height and weight of the resulting fuel cell system 200 is minimized as the compression retention system 208 of the disclosure does not employ tire rods with associated fastening devices and compressive means. Furthermore, the location and the alignment of individual springs 220 with respect to fuel cell end units 204, 206 are controlled to minimize bending moments. The minimization of bending moments facilitates the use of thinner sheets 210, 212, minimizing an overall mass and volume.

It should also be understood that the compression retention system 208 of the present disclosure is flexible or adaptable in that the spring rate of the system 208 can be easily adjusted to provide a wide range of load deflection curves. The compression retention system 208 is also adaptable as the location of the springs 220 can be adjusted to accommodate a wide array of fuel cell stack 2 designs.

With renewed reference to the end units 204, 206 disclosed herein, faster cold starts of the fuel cell system 200 are now realized by housing or integrating the fuel cell subsystems and related devices 207 into the end units 204, 206 of the fuel cell system 200. Previous systems using discrete subsystem components, e.g. air cooler and humidifier components, which are mostly surrounded by ambient air and exposed to underhood air flows (in automobile applications) transfer heat out of the fuel cell system 200 and inhibit cold starts. Integrated end units 204, 206 as disclosed herein also remain warm for a longer period after shutdown of the fuel cell system 200, reducing the extent of a cold start over a usage cycle. The faster start times for the fuel cell system 200 of the disclosure are also provided by the minimized thermal mass from the optimized componentry in the compression retention system 208 of the disclosure.

One of ordinary skill in the art should also understand that the compression retention system 208 of the disclosure is suitable for high volume processing. For example, additional componentry may not be required for the compression retention system 208 as the features may be stamped into the sheets 210, 212 of the system.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell system comprising:
    a fuel cell stack having a plurality of fuel cells disposed between a first end unit and a second end unit;
    a compression retention system comprising a first sheet coupled to the first end unit and a second sheet coupled to the second end unit; and
    a plurality of springs disposed between the first sheet and the second sheet adapted to apply a compressive force to the fuel cell stack,
    wherein the first sheet includes a plurality of first windows formed therein and the second sheet includes a plurality of second windows formed therein, wherein the plurality of first windows and the plurality of second windows cooperate to form a plurality of apertures adapted to receive the springs.

2. The fuel cell system of claim 1, wherein the plurality of springs are compressed.

3. The fuel cell system of claim 1, wherein at least one of the first sheet and the second sheet is formed from a metal.

4. The fuel cell system of claim 1, wherein the first sheet is disposed over the first end unit and the second sheet is disposed over the second end unit.

5. The fuel cell system of claim 1, wherein the springs are substantially centered between the first sheet and the second sheet, and substantially no bending moment is applied to the first sheet and the second sheet by the springs.

6. The fuel cell system of claim 1, wherein at least one of the first sheet and the second sheet include a plurality of alignment features formed thereon adapted to substantially center the plurality of springs.

7. The fuel cell system of claim 6, wherein the alignment features are formed on both of the first sheet and the second sheet.

8. The fuel cell system of claim 7, wherein the alignment features are tabs.

9. The fuel cell system of claim 1, wherein the compression retention system further includes a plurality of assembly spacers disposed on a plurality of alignment features.

10. The fuel cell system of claim 1, wherein at least one of the first sheet and the second sheet include at least one slot feature formed therein to facilitate insertion of the springs.

11. The fuel cell system of claims 1, wherein at least one of the first sheet and the second sheet is secured to at least one of the first end unit and the second end unit by one or more fastening devices.

12. The fuel cell system of claim 11, where the one or more fastening devices include at least one of a bolt, a weld, a rivet, a snap, and a clamp.

13. A method for assembling a fuel cell system comprising the steps of:
    providing a fuel cell stack having a first end unit and second end unit, the fuel cell stack including a plurality of fuel cells;
    providing a compression retention system having a first sheet with a plurality of first windows coupled to the first end unit; and a second sheet with a plurality of second windows coupled to the second end unit;
    aligning the first windows and the second windows to form a plurality of apertures; and
    inserting a spring into each of the plurality of apertures, wherein the springs and the first and second sheets cooperate to apply a compressive force to the fuel cell stack.

14. The method of claim 13, wherein the step of aligning the first windows and the second windows includes applying a first force to the first sheet, wherein the first sheet is urged toward the second end unit and applying a second force to the second sheet, wherein the second sheet is urged toward the first end unit, and the springs expand into the apertures to provide the compressive force to the fuel cell stack.

15. A method for assembling a fuel cell system comprising the steps of:
    providing a fuel cell stack having a first end unit and second end unit, the stack including a plurality of fuel cells;
    providing a compression retention system having a first sheet and a second sheet, the first sheet including a plurality of first windows formed therein and coupled to the first end unit, the second sheet including a plurality of second windows formed therein and coupled to the second end unit;
    aligning the first windows and the second windows to form a plurality of apertures;
    inserting a plurality of springs into the plurality of apertures; and
    applying a compression load to the plurality of springs to result in application of a compressive force to the fuel cell stack.

16. The method of claim 15, wherein the step of applying the compression load to the plurality of springs includes the step of applying a force to the second sheet, wherein the second sheet is urged toward the first end unit and the plurality of springs is compressed.

17. The method of claim 16, further including the step of securing the second sheet to the second end unit, wherein the compressive force is applied to the fuel cell stack.

18. The method of claim 15, wherein the step of applying the compression load to the plurality of springs includes providing a spring retainer device adapted to engage the first sheet; engaging the first sheet with the spring retainer device; and sliding the spring retainer device toward the second end unit, wherein the springs are compressed.

19. The method of claim 18, wherein the spring retainer device is further adapted to engage the second sheet.

* * * * *